May 25, 1954 F. WYKES 2,679,298
PROPELLER PITCH CONTROL DEVICE RESPONSIVE TO AIR SPEED
Filed March 4, 1947 3 Sheets-Sheet 1
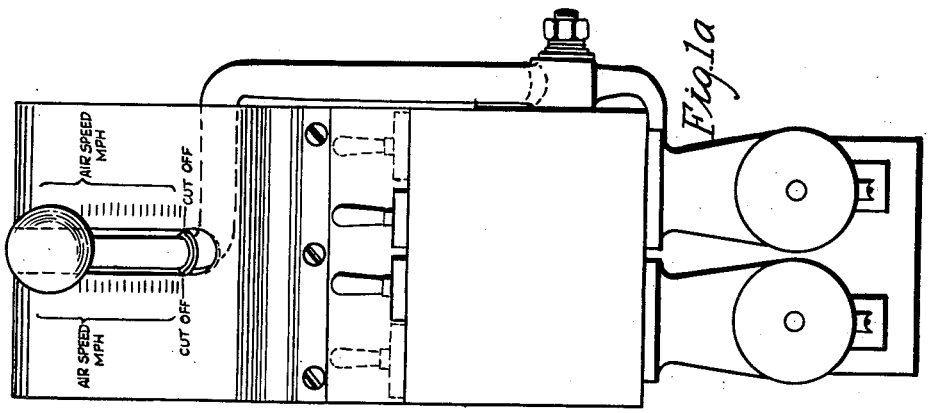
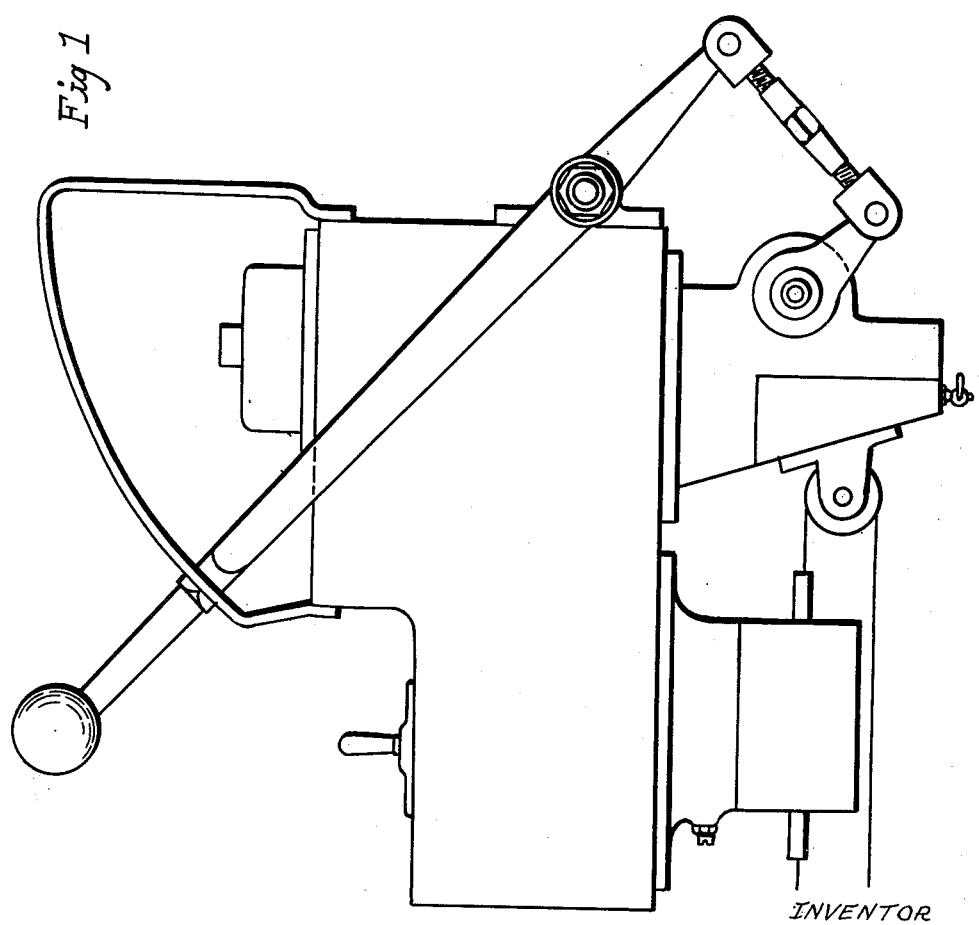
INVENTOR
FRANK WYKES
ATTORNEYS

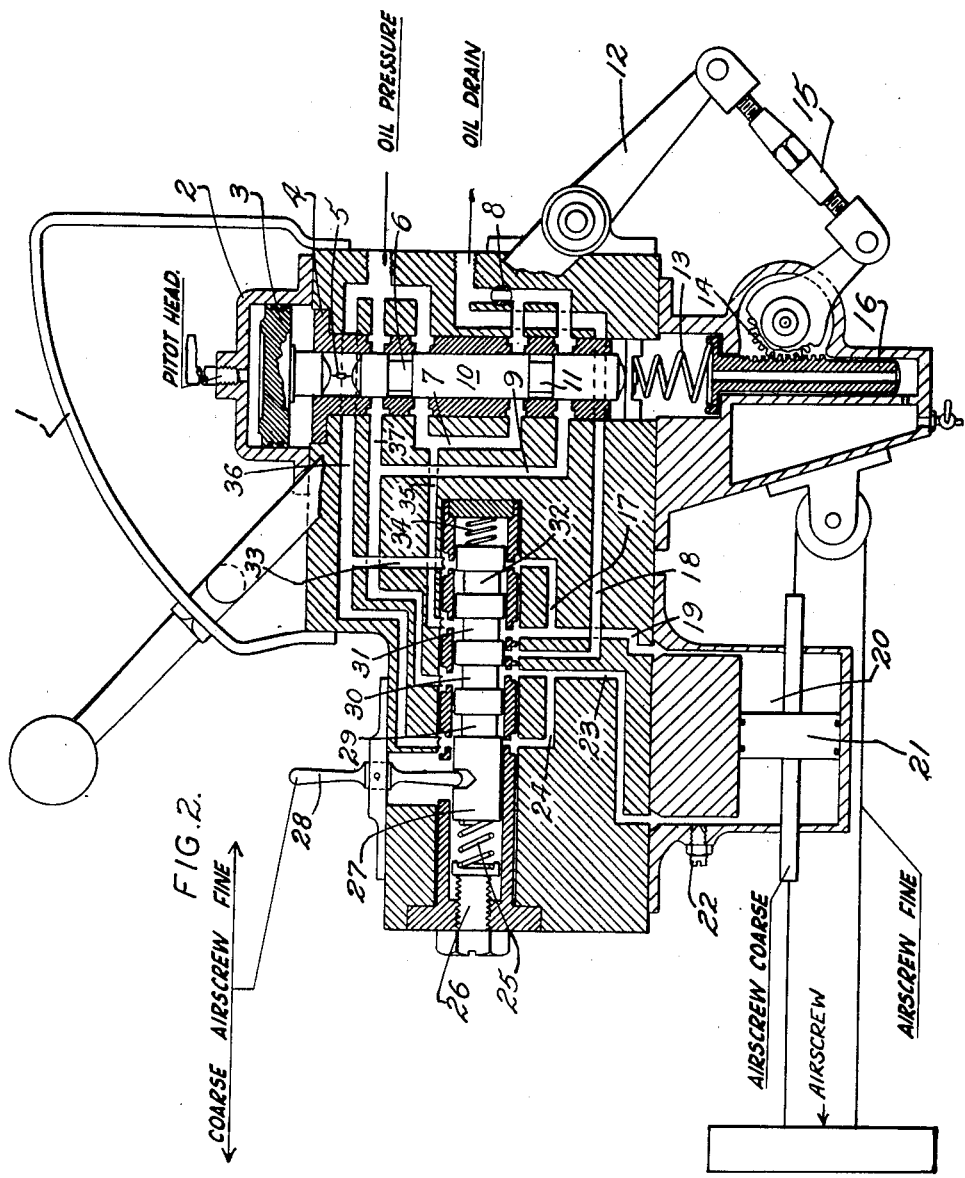

May 25, 1954
F. WYKES
2,679,298
PROPELLER PITCH CONTROL DEVICE RESPONSIVE TO AIR SPEED
Filed March 4, 1947
3 Sheets-Sheet 3
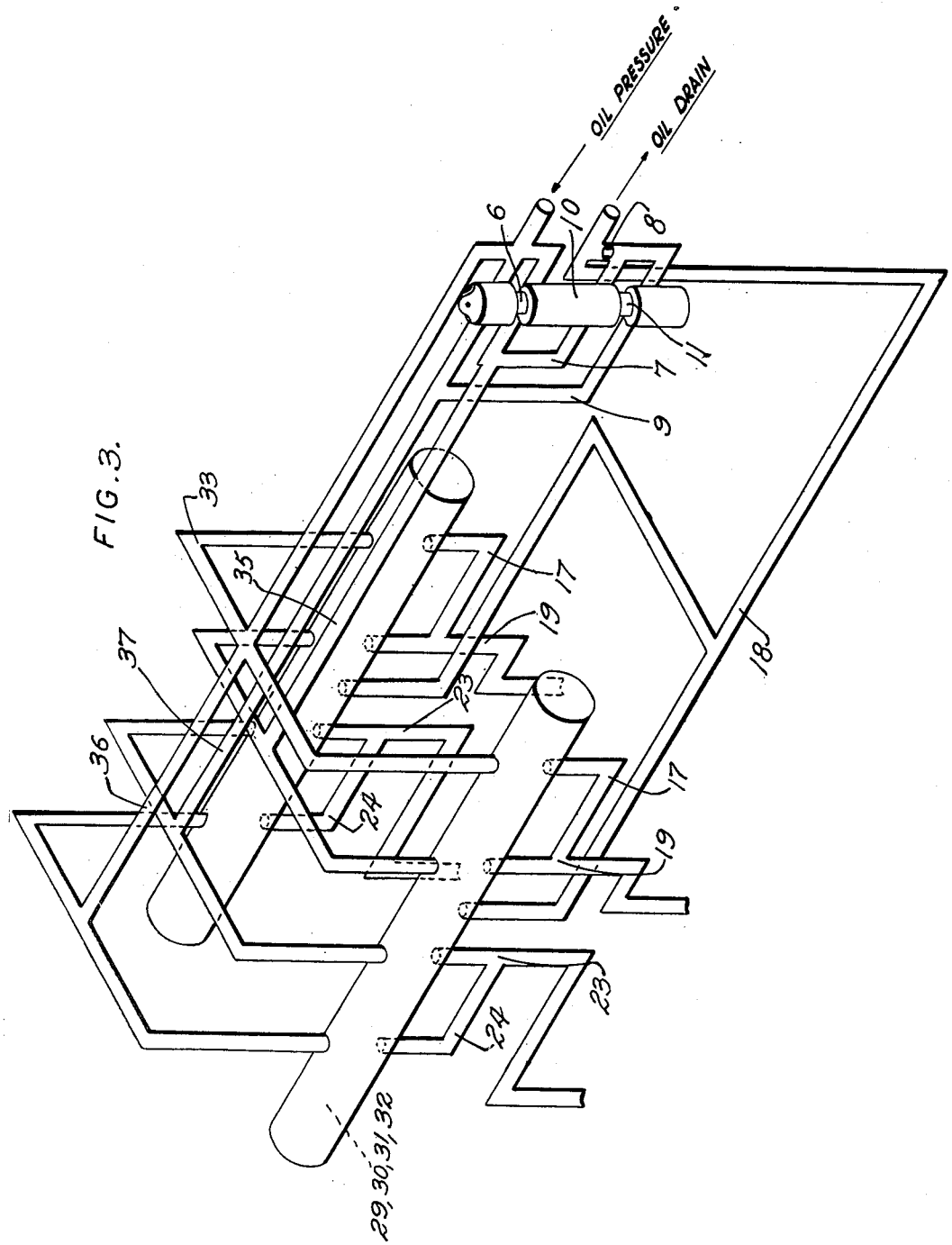
Inventor
FRANK WYKES
By Joseph Hirschman
Attorney Patented May 25, 1954

2,679,298

UNITED STATES PATENT OFFICE 2,679,298

PROPELLER PITCH CONTROL DEVICE RESPONSIVE TO AIR SPEED

Frank Wykes, Hamworthy, Poole, England

Application March 4, 1947, Serial No. 732,290

6 Claims. (Cl. 170—160.15)

This invention relates to an automatic airscrew and air speed control unit for single or multi-engine aircraft with the object of eliminating all manual airscrew controls in the cockpit.

According to one aspect of the present invention, I provide a speed regulator for an automatic power and air speed limit comprising means to automatically control any desired indicated air speed by air speed pressure.

According to other aspects of the invention, in a speed regulator for an automatic power and air speed limit, I provide:

Means to automatically control the angle of the airscrew blades at any desired indicated air speed by air speed pressure;

Means to automatically control the angle of the airscrew blades by the variation of the weight of the aircraft at any desired indicated air speed by air speed pressure;

Means to automatically control the angle of the airscrew blades by the angle of attack of the aircraft at any desired indicated air speed by air speed pressure;

Means to automatically control the angle of the airscrew blades by variation of boost pressure or throttle opening at any desired indicated air speed by air speed pressure;

Means to automatically control an airscrew constant speed unit by air speed pressure at any indicated air speed.

In accordance with the present invention, I also provide a lever which selects the air speed required by the aircraft for any operation, such as for take off, maximum climb, cruising and so forth; means being provided for the air speed lever control to give correct tensions on a resilient arrangement according to the air speed required by the aircraft so that the tension on the resilient arrangement operates a main oil control valve which by-passes oil to individual airscrew control receiver units. These in turn operate the airscrews so that when the air speed pressure on a piston is equal to the tension on the resilient arrangement, the oil valve closes.

Incorporated in this unit are individual airscrew control levers which can be used for running up airscrews on the ground. The number required depends on the number of airscrews installed in the aircraft.

The oil pressure necessary to operate this unit may be utilized from the hydraulic system; on aircraft where hydraulic accumulators are fitted, it is possible to operate the airscrews into fine pitch by levers for starting the engines.

If hydraulic accumulators are not fitted in the hydraulic system, a small electric booster pump should be incorporated to give oil pressure to the main oil control valve of the unit, until the engine is running to which the hydraulic pump is fitted; when this pump is operating the electric booster pump may be turned off.

The accompanying drawings illustrate one form of the invention as applied to a two engine installation:

Fig. 1 is a side elevation of an airscrew control unit and calibrated quadrant.

Fig. 1a is a front view of the control unit.

Fig. 2 is a sectional side elevation of an automatic airscrew control and air speed control unit.

Fig. 3 is a diagrammatic view of oil runs for an automatic airscrew and air speed control unit.

The air speed selector lever 12 has a calibrated quadrant 1 calibrated in air speed miles per hour.

When the air speed lever 12 is moved to a greater air speed marked on the quadrant 1 than the aircraft is flying, the main oil control valve 10 will travel upwards allowing oil from the pressure side to pass around waste 6 in main oil control valve 10 then into passage 37 around waste 30 in selector valve 27 into passage 23 which enters cylinder 20.

Oil on the other side of piston 21 will flow through passage 19 around waste 31 in selector valve 27 into passages 35 and 7 around waste 11 in main oil control valve 10 into the main oil drain line. This in turn moves piston 21 to the right (Fig. 2) and gradually puts the airscrew blades into a finer pitch which also in turn increases the engine B. H. P., which is needed if the aircraft requires a greater air speed.

When this speed is obtained, the air pressure from the Pitot head entering the cylinder 2 and operating on piston 3 will lower the main oil control valve 10 shutting off the oil supply to piston 3.

If the aircraft is required to fly at a reduced air speed, the air speed required is selected on quadrant 1 by the air speed selector lever 12. This will reduce the tension on the conical helical spring 13. Now the air speed pressure on piston 3 from the Pitot head will be greater than the tension on the spring 13, so the main oil control valve 10 will travel downwards allowing the oil to drain from the left side of piston 21 through passage 23 around waste 30 in selector valve 27 into passages 37 and 9 around waste 11 in main oil control valve 10 and into the main oil drain.

Oil pressure will travel from the oil pressure supply around waste 6 in main oil control valve 10 into passage 35 around waste 31 in selector valve 27 through passage 19 into cylinder 20 moving piston 21 which in turn coarsens the airscrew blades slowly. As the power of the engine falls off, the speed of the aircraft will decrease, also the air pressure on piston 3 so the main control valve 10 will gradually rise to the shut off position. When this is obtained, piston 21 will cease to travel any further and the aircraft will be flying at the air speed selected which will be the indicated air speed.

The selector valve 27 is balanced by two springs, 34 and 25, one being slightly stronger than the other. Thus by adjusting the screw 26, the position for the valve 27 as shown on the drawing can be obtained. This valve is operated by the lever marked 28, and if operated towards the rear of the unit the airscrew will start to coarsen; at the same time valve 27 will cut out of operation the main oil control valve 10, whatever position it may be in.

When the lever 28 is towards the rear of the unit, the selector valve 27 will have moved towards the forward end of the unit, thus closing oil passages 19 and 37 and opening passages 18, 17 and 33, the latter being integral with 36, which by-passes the main oil control valve 10, and joins up direct to the oil pressure supply.

The oil pressure now flows through passages 36 and 33, around waste 32, in selector valve 27 into passages 17 and 19, which leads to the front side of piston 21 in cylinder 20. Oil drains from the other side of piston 21 through passage 23 into waste 30 in oil selector valve 27 into passage 18 which by-passes the main oil control valve 10 direct into the main oil drain, thus coarsening the airscrew blades. If the lever 28 is moved towards the front end of the unit, the selector valve 27 will move towards the rear of the unit thus closing passages 23 and 35 and at the same time opening passages 18 and 36. Oil pressure will now flow from the main oil pressure supply, by-passing the main oil control valve 10, into passage 36 around waste 29 in selector valve 27 into passages 24 and 23 which enters the cylinder 20. Oil from the other side of piston 21 drains through passages 19 and 18 which by-pass the main oil control valve 10 and goes direct into the main oil drain. This will give the airscrews fine pitch position.

*Take off and cruising*

With aircraft ready for take off and the engines at slow running, the maximum climb speed on the air speed selector lever is selected. The airscrews will then go to fully fine and the aircraft can take off when the correct ground speed is obtained. As soon as the aircraft reaches its selected climbing speed, the airscrews will start to coarsen. When the aircraft has reached say a 1,000 ft. altitude, the pilot can start to level out and select the best cruising boost according to the manufacturer's recommendation and the airscrews will coarsen to give that indicated air speed selected by the air speed selector lever 12. As the load of the aircraft decreases, the airscrews will automatically coarsen giving the correct power for the air speed selected. This operation gives a better air-miles per gallon performance.

If the aircraft is crusing at a constant altitude and for some reason a higher altitude is required, all that is necessary, is to pull back on the elevator control and the airscrews will go to a finer pitch, keeping the aircraft at a constant indicated air speed at which it was flying before the aircraft was put into the climb. The angle at which the aircraft can climb will be controlled by the amount of boost selected; the steeper the angle of climb the more boost will be required, and the maximum allowed will be the rated boost for that particular engine. When the desired altitude is reached and the aircraft is levelled out, the airscrews will automatically coarsen, still keeping the aircraft at the same indicated air speed, providing that the pilot has not interfered with the throttle.

When an engine ground run is required, the selector lever 12 is placed in the cut-off position marked on the quadrant 1. This will select the main oil control valve 10 in the cut-off position and a complete operation of the airscrews on a run up of the engine can be operated by the manipulation of lever 28. If only a small adjustment of the airscrew is required, lever 28 is held in the forward position until the revolutions required are obtained; then, the lever 28 is allowed to return to its normal position and the revolutions per minute will remain constant.

To adjust selector lever 12 for correct setting position, it is set in the cut-off position and the linkage 15 is adjusted until the main oil control valve 10 is in the shut-off position; then the linkage 5 is adjusted so that the piston 3 is in the center of cylinder 2.

If for any reason the automatic part of the unit is not required in flight, the drain cock 8 should be turned off. This will cut out of operation the main oil control valve 10, and the aircraft can be flown as normal by using the lever 28 as an airscrew control lever.

Piston 21 is coupled to the airscrew constant speed unit by cable. If cables are not preferred, then small oil lines can be run to the engine nacelle and the cylinder 20, including piston 21, can be installed just behind the engine making a direct control to the constant speed unit.

When this unit is fitted to a multi-engine aircraft, for example, say four engines, the same unit is used with one air speed selector lever 12 and one main oil control valve 10 but a selector valve 27 would be required for each engine together with a cylinder and piston 21. The oil passages from the other selector valves could join into passages 35 and 37 or have independent wastes on the main control valve 10. If the unit is fitted to a single engine aircraft, then only one valve 27 would be required. Screw 22 controls the speed of oil flow to and from the cylinder 20, if the unit was controlling four airscrews it is understood there would be four cylinders. So the screws 22 would be adjusted to give the same amount of drop or increase in revolutions per minute on all airscrews in the same amount of time.

When the air speed lever 12 is moved to the maximum climb speed on quadrant 1 for take off, the airscrew will move to fine pitch and when the aircraft tries to obtain a greater speed than selected, the airscrew will coarsen sufficiently to maintain the selected speed.

When the most economical cruising speed is selected and the aircraft starts to lose weight by the use of fuel, the aircraft indicated air speed will remain constant because the airscrews will be adjusted automatically to a coarser pitch.

If the aircraft is flying at a constant altitude and the pilot puts the aircraft into a climb, then the airscrews will automatically change into a finer pitch. If the pilot puts the aircraft nose down, then the airscrews will go into a coarser pitch.

If the pilot wishes to operate the airscrews in the ordinary way, it will be necessary to turn the drain cock 8 which will then cut out the automatic port. Then the levers 28 can be used to operate the airscrews in the normal way.

If the aircraft was flying at a constant speed selected on lever 12 and the pilot opened the throttle, then the airscrew would change to another pitch automatically to keep the aircraft at a constant indicated air speed.

Having now particularly described and ascertained the nature of my said invention and in what manner the same is to be performed, I declare that what I claim is:

1. In an aircraft having a variable pitch airscrew, apparatus for automatically varying the pitch of the screw and comprising, in combination, a chamber, a movable control element therein, an air inlet at one side of said chamber and adapted to be connected to an air flow responsive device to subject said element to a pressure corresponding to the speed of the aircraft, a spring acting on said movable element in opposition to said pressure, manually operable means for varying the force exerted by said spring, an indicator associated with the said manual means for indicating the selected position of such means, said manually operable means comprising a pivoted lever movable through a limited angle, a gear segment operated by the lever, and a slidable rod mounted co-axially with and supporting the spring and having a rack engaged with the gear segment; a pitch varying device movable under control of said control element, and force transmitting means connected to said device and adapted to be connected to the airscrew to regulate the pitch thereof.

2. In an aircraft having a varying pitch airscrew, apparatus for automatically varying the pitch of the screw and comprising, in combination, a chamber, a movable control element therein, an air inlet at one side of said chamber and adapted to be connected to an air flow responsive device to subject said element to a pressure corresponding to the speed of the aircraft, a spring acting on said movable element in opposition to said pressure, manually operable means for varying the force exerted by said spring, an oil pressure supply conduit and an oil drain conduit, a slidable valve mechanism interposed between the spring and movable element and controlling said oil supply and drain conduits, a pitch varying device comprising a cylinder, a movable piston therein, and oil supply and drain passageways connected with said valve to effect movement of the piston in the one or other direction in dependence upon the position of said valve, and force transmitting means connected to said device and adapted to be connected to the airscrew to regulate the pitch thereof.

3. The combination as defined in claim 2 including a second slide valve controlling the oil supply and drain passageways connected with the said cylinder, oil supply and drain passageways associated with said second slide valve and by-passing the first slide valve, and manual means for adjusting the second valve.

4. In an aircraft having a varying pitch airscrew, apparatus for automatically varying the pitch of the screw and comprising, in combination, a chamber, a movable control element therein, an air inlet at one side of said chamber and adapted to be connected to an air flow responsive device to subject said element to a pressure corresponding to the speed of the aircraft, a spring acting on said movable element in opposition to said pressure, manually operable means for carrying the force exerted by said spring, an oil pressure supply conduit and an oil drain conduit, a pitch varying device comprising a cylinder, a movable piston therein, and oil supply and drain passageways connected with said cylinder to supply oil pressure oil to one or the other side of the piston and to drain oil from the opposite side, means for regulating the supply and drainage of oil to and from the cylinder and comprising a slide valve automatically controlled by the movable control element, and a second slide valve having manually operating means therefor and movable to control the oil supply and drainage passageways connected to the cylinder and simultaneously to disconnect said passageways from the first slide valve to make the movements of the piston independent of the movable control element, and force transmitting means connected to said piston and adapted to be connected to the airscrew to regulate the pitch thereof.

5. In an aircraft having a varying pitch airscrew, apparatus for automatically varying the pitch of the screw and comprising, in combination, a chamber, a movable control element therein, an air inlet at one side of said chamber and adapted to be connected to an air flow responsive device to subject said element to a pressure corresponding to the speed of the aircraft, a spring acting on said movable element in opposition to said pressure, manually operable means for varying the force exerted by said spring, a pitch varying device comprising a cylinder, a movable piston therein, and pressure oil supply and drain passageways for charging pressure oil to one or the other side of the piston and discharging oil from the opposite side thereof; a main oil pressure supply conduit and a main oil drain conduit, a slide valve acted upon by the movable control element and the spring, a second slide valve having means for manually operating the same, passageways leading to both valves from the main oil pressure and oil drain conduits, pressure oil passageways and drainage passageways controlled by both slide valves, pressure oil and drainage passageways controlled only by the second slide valve, said passageways being connectable through the second slide valve to the oil supply and drainage passageways connected to the cylinder, said second slide valve being manually movable to disconnect the cylinder from the first valve and to connect it directly to the main oil supply and drainage conduits, and force transmitting means connected to the piston and adapted to be connected to the airscrew to regulate the pitch thereof.

6. The combination as defined in claim 5 wherein the first slide valve is disposed axially between the spring and movable control element, while the second slide valve is disposed approximately perpendicularly thereto.

References Cited in the file of this patent

UNITED STATES PATENTS

| Number | Name | Date |
|---|---|---|
| 1,908,894 | Findley | May 16, 1933 |
| 2,209,879 | Focke | July 30, 1940 |
| 2,243,095 | Hammond, Jr., et al. | May 27, 1941 |
| 2,272,664 | Gropler | Feb. 10, 1942 |
| 2,346,979 | Lilley | Apr. 18, 1944 |
| 2,347,104 | Hoover | Apr. 18, 1944 |
| 2,360,791 | Putnam | Oct. 17, 1944 |
| 2,377,457 | Stalker | June 5, 1945 |
| 2,389,170 | Stalker | Nov. 20, 1945 |
| 2,422,758 | Temple | June 24, 1947 |
| 2,432,320 | Lilley | Dec. 9, 1947 |